United States Patent
Wen et al.

(10) Patent No.: US 11,687,475 B1
(45) Date of Patent: Jun. 27, 2023

(54) LARGE TOUCH DISPLAY INTEGRATED CIRCUIT AND OPERATION METHOD THEREOF

(71) Applicant: HIMAX TECHNOLOGIES LIMITED, Tainan (TW)

(72) Inventors: Shan-Chieh Wen, Tainan (TW); Ming-Huai Weng, Tainan (TW); Guei-Lan Lin, Tainan (TW); Che-Hao Chiang, Tainan (TW); Chi-Cheng Lin, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/558,600

(22) Filed: Dec. 22, 2021

(51) Int. Cl.
*G06F 13/362* (2006.01)
*G06F 11/10* (2006.01)
*G06F 9/4401* (2018.01)
*G06F 13/42* (2006.01)

(52) U.S. Cl.
CPC .......... *G06F 13/362* (2013.01); *G06F 9/4401* (2013.01); *G06F 11/1004* (2013.01); *G06F 13/4282* (2013.01)

(58) Field of Classification Search
CPC .. G06F 9/4401; G06F 11/1004; G06F 13/362; G06F 13/4282
See application file for complete search history.

(56) References Cited

U.S. PATENT DOCUMENTS

| | | | |
|---|---|---|---|
| 2016/0328300 A1* | 11/2016 | Rahardjo | G06F 11/1417 |
| 2019/0073478 A1* | 3/2019 | Khessib | G06F 13/4282 |
| 2019/0258539 A1 | 8/2019 | Zhu et al. | |
| 2020/0250313 A1* | 8/2020 | Li | G06F 11/1004 |
| 2021/0374022 A1 | 12/2021 | Gorbold et al. | |

OTHER PUBLICATIONS

"Search Report of Europe Counterpart Application", dated Dec. 14, 2022, p. 1-p. 7.

* cited by examiner

*Primary Examiner* — Eric T Oberly
(74) *Attorney, Agent, or Firm* — JCIPRNET

(57) ABSTRACT

The invention provides a large touch display integrated (LTDI) circuit and an operation method thereof. The LTDI circuit is suitable as a slave IC of an serial peripheral interface (SPI) architecture. The LTDI circuit includes an open-drain circuit and a reload circuit. An output terminal of the open-drain circuit is configured to be coupled to a correctness wire outside the LTDI circuit. The correctness wire is also coupled to an input terminal of a master IC of the SPI architecture, and a potential of the correctness wire is pulled up by a pull-up resistor. The reload circuit is coupled to an input terminal of the open-drain circuit. The reload circuit is configured to check a correctness of a boot up code from the master IC to generate a correctness check result. The reload circuit returns the correctness check result to the master IC via the open-drain circuit and the correctness wire.

12 Claims, 6 Drawing Sheets

LARGE TOUCH DISPLAY INTEGRATED CIRCUIT AND OPERATION METHOD THEREOF

BACKGROUND OF THE INVENTION

Field of the Invention

The invention relates to an integrated circuit (IC), and particularly relates to a serial peripheral interface (SPI) IC and an operation method thereof.

Description of Related Art

Some product applications may require a plurality of integrated circuits (ICs) operating together. For example, in large touch display integrated (LTDI) circuit applications, a plurality of (for example, 30) drive ICs are operated together to drive the same large touch display panel. The SPI architecture may provide a multi-drop driving architecture. In the multi-drop driving architecture, the master IC may connect/drive a plurality of slave ICs via the same wire (channel). The master IC may transmit a boot up code to a plurality of slave ICs to boot up these slave ICs. In the traditional SPI architecture, after the master IC transmits the boot up code to these slave ICs, the current master IC confirms to these slave ICs whether they received the correct boot up code one at a time using a handshake mechanism. How to make the master IC boot up a plurality of slave ICs simply and efficiently is one of many technical issues in the art.

SUMMARY OF THE INVENTION

The invention provides a large touch display integrated (LTDI) circuit and an operation method thereof that may simply and efficiently broadcast an open-drain signal (correctness check result) to a master IC via a correctness wire.

In an embodiment of the invention, the LTDI circuit is suitable as a slave IC of an SPI architecture. The LTDI circuit includes a first open-drain circuit and a reload circuit. An output terminal of the first open-drain circuit is configured to be coupled to a correctness wire outside the LTDI circuit. The correctness wire is also coupled to a first input terminal of a master IC of the SPI architecture, and a potential of the correctness wire is pulled up by a first pull-up resistor. The reload circuit is coupled to an input terminal of the first open-drain circuit. The reload circuit is configured to check a correctness of a boot up code from the master IC to generate a correctness check result. The reload circuit returns the correctness check result to the master IC via the first open-drain circuit and the correctness wire.

In an embodiment of the invention, the operation method includes: checking a correctness of a boot up code from a master IC of the SPI architecture by a reload circuit of the LTDI circuit to generate a correctness check result; outputting the correctness check result to a first open-drain circuit of the LTDI circuit by the reload circuit, wherein an output terminal of the first open-drain circuit is configured to be coupled to a correctness wire outside the LTDI circuit, the correctness wire is also coupled to a first input terminal of the master IC, and a potential of the correctness wire is pulled up by a first pull-up resistor; and returning the correctness check result to the master IC via the correctness wire by the first open-drain circuit.

Based on the above, the correctness check result of the embodiments of the invention is an open-drain signal. In the SPI architecture, one or a plurality of slave ICs (such as the LTDI circuit) may broadcast the open-drain signal (correctness check result) to the master IC via the correctness wire. For example, when the boot up code received by one (or a plurality) of these slave ICs is incorrect, the slave ICs with an error may pull down the potential of the correctness wire to a low logic level; and when the boot up code received by these slave ICs are all correct, these slave ICs are all in a high-impedance state (Hi-Z) for the correctness wire, and at this time, the first pull-up resistor may pull up the potential of the correctness wire to a high logic level. After the master IC transmits the boot up code to these slave ICs, the master IC may determine whether all the slave ICs (such as the LTDI circuit) correctly received the boot up code according to the potential of the correctness wire. Therefore, the master IC may boot up a plurality of slave ICs simply and efficiently.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
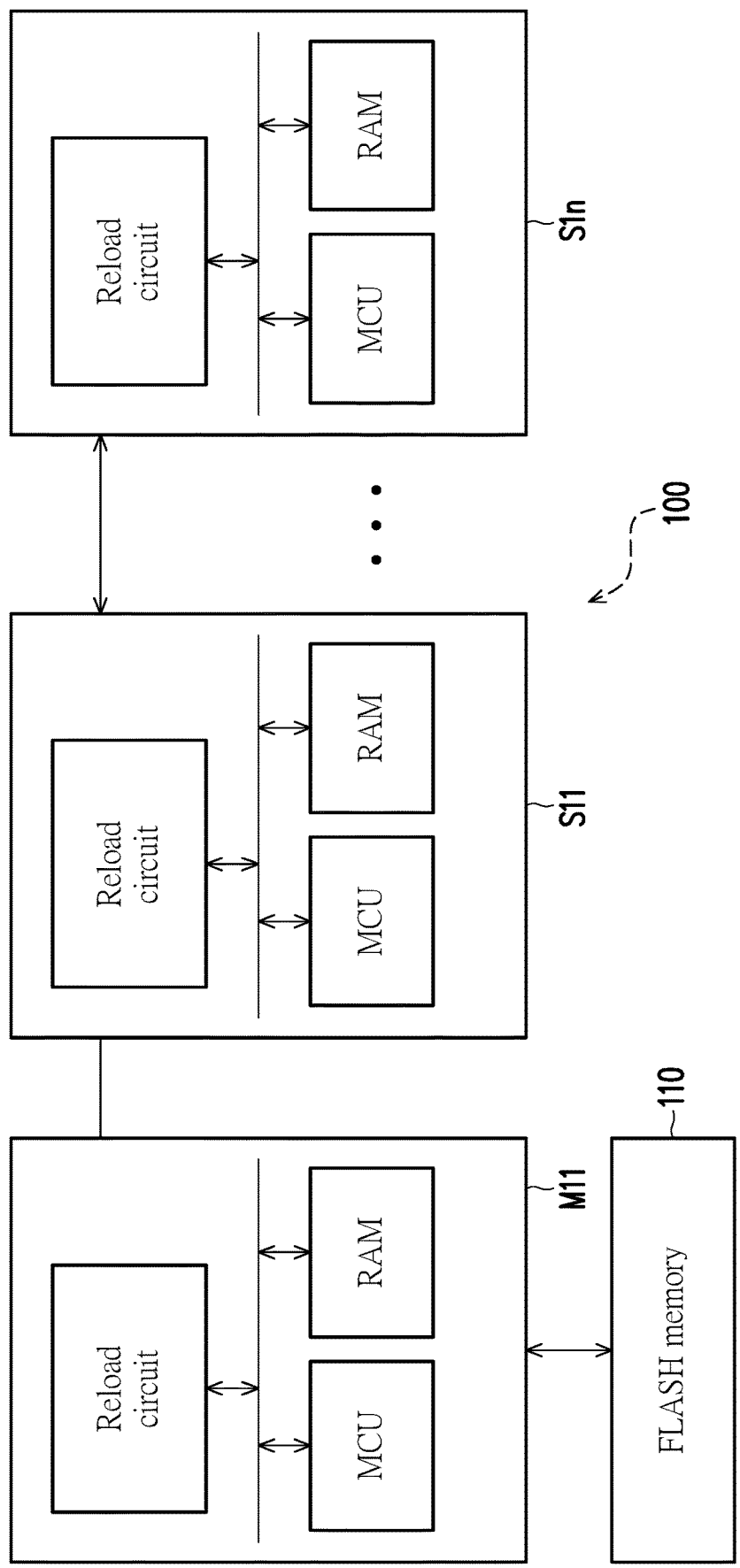
FIG. 1 is a schematic diagram of a circuit block of a serial peripheral interface (SPI) architecture according to an embodiment.

The term "coupled to (or connected to)" used in the entire text of the specification of the present application (including claims) may refer to any direct or indirect connecting means. For example, if the text describes a first device is coupled to (or connected to) a second device, then it should be understood that the first device may be directly connected to the second device, or the first device may be indirectly connected to the second device via other devices or certain connecting means. Terms such as "first" and "second" mentioned in the entire specification of the present application (including the claims) are used to name the elements or to distinguish different embodiments or ranges, and are not used to restrict the upper or lower limits of the number of elements, nor are they used to limit the order of the elements. Moreover, when applicable, elements/components/steps having the same reference numerals in figures and embodiments represent the same or similar parts. Elements/components/steps having the same reference numerals or having the same terminology in different embodiments may be cross-referenced.

FIG. 1 is a schematic diagram of a circuit block of a serial peripheral interface (SPI) architecture 100 according to an embodiment. In the embodiment shown in FIG. 1, the SPI architecture 100 includes a plurality of large touch display integrated (LTDI) circuits, such as a LTDI circuit M11 and LTDI circuits S11 . . . S1n. The LTDI circuits M11 and S11~S1n can jointly drive/control a large-size touch display panel (not shown). The LTDI circuit M11 can be used as a master IC of the SPI architecture 100, and the LTDI circuits S11 to S1n can be used as a slave IC of the SPI architecture 100. The number n of LTDI circuits S11 to S1n may be determined according to the actual design. In the SPI architecture 100, the LTDI circuit M11 can transmit data (such as boot up code) to the LTDI circuits S11 to S1n through a cascade SPI interface. The LTDI circuit M11 can transmit a boot up code to the LTDI circuits S11 to S1n to boot up these LTDI circuits S11 to S1n.

In detail, after booting, the reload circuit (not shown) of the LTDI circuit M11 copies the boot up code required by the LTDI circuits S11~S1n from the FLASH memory 110 to the random access memory (RAM) of the LTDI circuit M11. Next, the microcontroller unit (MCU) of the LTDI circuit M11 transmits the boot up code to the RAM of the LTDI circuits S11 to S1n through the cascade SPI interface. The reload circuit of LTDI circuits S11~S1n will calculate the cyclic redundancy check (CRC) code of the received boot up code. In order to know whether the LTDI circuits S11~S1n have received the boot up code correctly, the LTDI circuit M11 will send a read command to each of the LTDI circuits S11~S1n through the cascade SPI interface, and then read back the CRC code calculated by the reload circuit of each of LTDI circuits S11~S1n through the cascade SPI interface. The LTDI circuit M11 can determine whether each of the LTDI circuits S11 to S1n has received the boot up code correctly according to the read back CRC code. The more the number of serially connected ICs of the SPI architecture 100, the longer it takes to read back the CRC codes of all LTDI circuits S11 to S1n. For LTDI applications where a large number of ICs are connected in series, the boot time is too long to meet the requirements.

Figure 2:
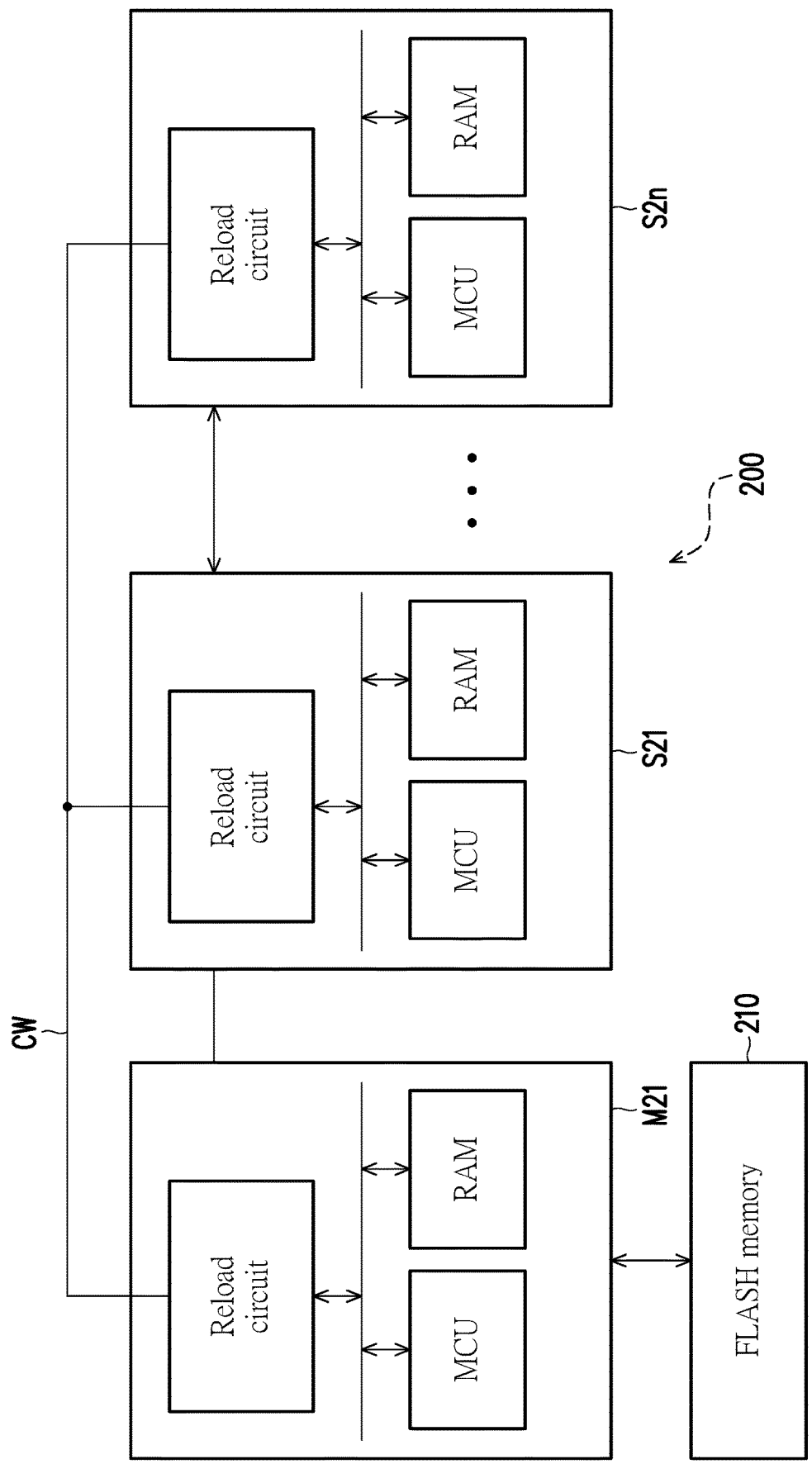
FIG. 2 is a schematic block diagram of a circuit in which slave ICs broadcast a correctness check result (open-drain signal) to a master IC via a correctness wire shown according to an embodiment of the invention.

FIG. 2 is a schematic block diagram of a circuit in which the LTDI circuits S21 to S2n broadcast a correctness check result (open-drain signal) to the LTDI circuit M21 via a correctness wire CW shown according to an embodiment of the invention. In the embodiment shown in FIG. 2, the SPI architecture 200 includes a plurality of LTDI circuits, such as LTDI circuit M21 and LTDI circuits S21, . . . , S2n. The LTDI circuit M21 and S21~S2n can jointly drive/control a large-size touch display panel (not shown). The LTDI circuit M21 can be used as the master IC of the SPI architecture 200, and the LTDI circuits S21 to S2n can be used as the slave IC of the SPI architecture 200. The number n of LTDI circuits S21-S2n can be determined according to the actual design. In the SPI architecture 200, the LTDI circuit M21 can transmit a boot up code to each of the LTDI circuits S21 to S2n through the cascade SPI interface to activate the LTDI circuits S21 to S2n. The FLASH memory 210, the LTDI circuit M21 and the LTDI circuits S21 to S2n shown in FIG. 2 can refer to the related description of the FLASH memory 110, the LTDI circuit M11 and the LTDI circuits S11 to S1n shown in FIG. 1, and are therefore not repeated herein.

The LTDI circuit M21 is not only coupled to the slave integrated circuits S11 to S1n via a cascade SPI channel/ interface, but in the embodiment shown in FIG. 2, the LTDI circuit M21 may also be coupled to the LTDI circuits S21 to S2n via the correctness wire CW. After the LTDI circuit M21 transmits the boot up code to the LTDI circuits S21 to S2n, the LTDI circuits S21 to S2n can check the correctness of the boot up code from the LTDI circuit M21 to generate a correctness check result. These LTDI circuits S21 to S2n can broadcast an open drain signal (correctness check result) to the LTDI circuit M21 through the correctness wire CW.

For example, in some embodiments, when the boot up code received by one (or a plurality) of these LTDI circuits S21 to S2n is incorrect, the LTDI circuit with an error may pull down the potential of the correctness wire CW to a low logic level; and when the boot up code received by these LTDI circuits S21 to S2n are all correct, these LTDI circuits S21 to S2n are all in a high-impedance state (Hi-Z) for the correctness wire CW, and at this time, the pull-up resistor (not shown in FIG. 2) of the LTDI circuit M21 may pull up the potential of the correctness wire CW to a high logic level. Therefore, the LTDI circuit M21 may determine whether all the LTDI circuits S21 to S2n received the boot up code correctly according to the potential of the correctness wire CW. Compared with the embodiment shown in FIG. 1, in the embodiment shown in FIG. 2, the LTDI circuit M21 does not need to read back all the CRC codes of the LTDI circuits S21 to S2n. Accordingly, the LTDI circuit M21 may boot up the plurality of LTDI circuits S21 to S2n simply and efficiently.

Figure 3:
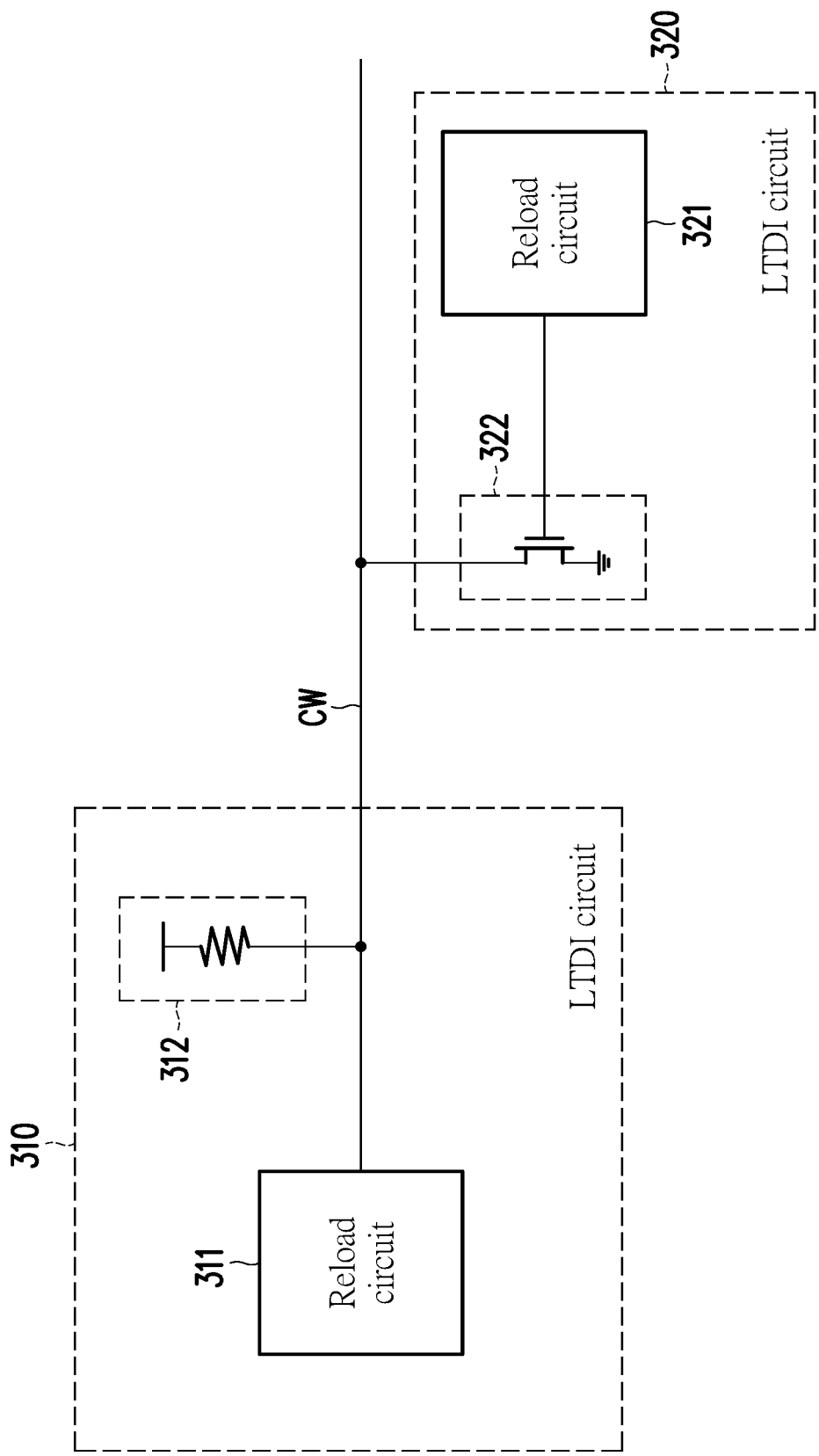
FIG. 3 is a circuit block diagram of an LTDI circuit according to an embodiment of the invention.

FIG. 3 is a circuit block diagram of an LTDI circuit according to an embodiment of the invention. FIG. 3 shows an LTDI circuit 310 and an LTDI circuit 320, wherein the LTDI circuit 310 may be used as the LTDI circuit M21 in the SPI architecture 200 shown in FIG. 2, and the LTDI circuit 320 may be used as one of the LTDI circuits S21 to S2n in the SPI architecture 200 shown in FIG. 2. The LTDI circuit 310 includes a reload circuit 311 and a pull-up resistor 312. The correctness wire CW shown in FIG. 3 is as provided in the related description of the correctness wire CW shown in FIG. 2, and is therefore not repeated herein. The correctness wire CW is coupled to the input terminal of the LTDI circuit 310 (the master IC). The potential of the correctness wire CW may be pulled up by the pull-up resistor 312 (weak pull-up). When all the LTDI circuits S21 to S2n (such as the LTDI circuit 320) shown in FIG. 2 are all in a high-impedance state for the correctness wire CW, the pull-up resistor 312 of the LTDI circuit 310 (the master IC) may pull up the potential of the correctness wire CW to a high logic level.

In the embodiment shown in FIG. 3, the LTDI circuit 320 includes a reload circuit 321 and an open-drain circuit 322. The output terminal of the open-drain circuit 322 may be coupled to the correctness wire CW outside the LTDI circuit 320. The reload circuit 321 is coupled to the input terminal of the open-drain circuit 322. The reload circuit 321 may check the correctness of a boot up code from the LTDI circuit 310 (the master IC) to generate a correctness check result. The reload circuit 321 may return the correctness check result to the LTDI circuit 310 (the master IC) via the open-drain circuit 322 and the correctness wire CW.

Figure 4:
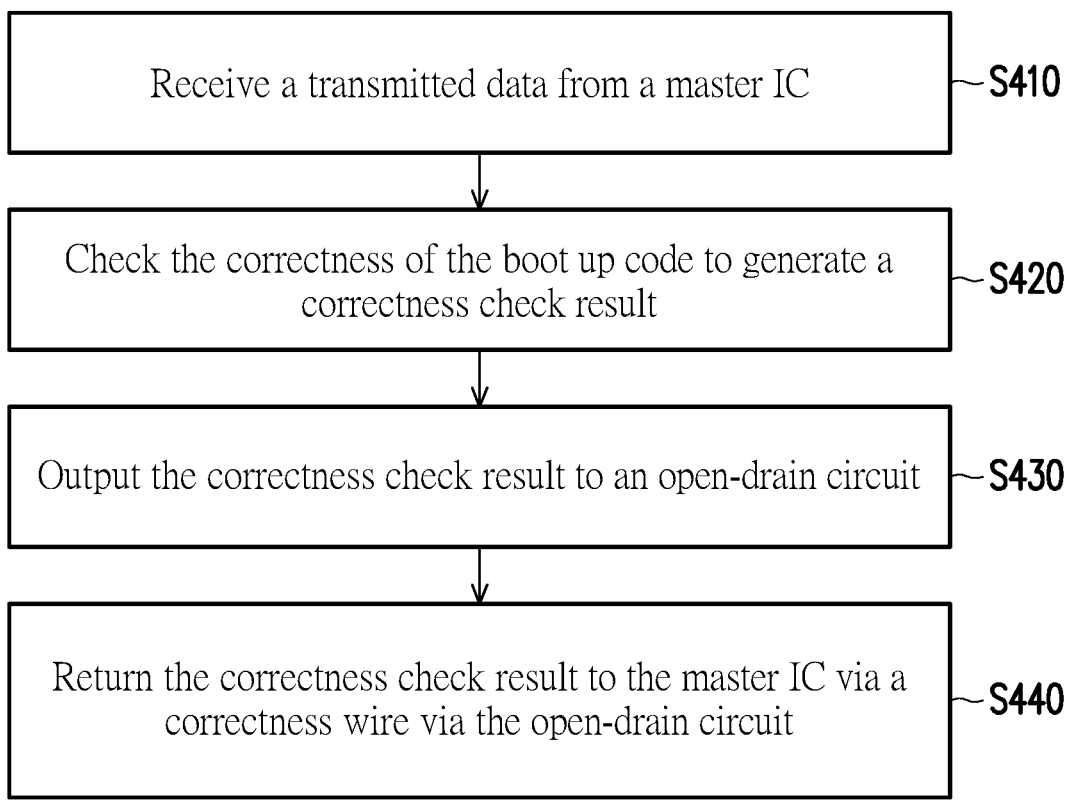
FIG. 4 is a flowchart of an operation method of an LTDI circuit according to an embodiment of the invention.

FIG. 4 is a flowchart of an operation method of an LTDI circuit according to an embodiment of the invention. Please refer to FIG. 3 and FIG. 4. The reload circuit 311 may generate a boot up code for the LTDI circuit 320 (slave IC, that is, the target slave circuit). In step S410, the reload circuit 321 may receive the boot up code from the LTDI circuit 310 (the master IC). In step S420, the reload circuit 321 may check the correctness of the boot up code from the LTDI circuit 310 to generate a correctness check result. The present embodiment does not limit the checking method of the boot up code. For example, in some actual designs, the reload circuit 311 may output a boot up code, and the reload circuit 311 may also generate a debugging information corresponding to the boot up code.

The present embodiment does not limit the specific generation method of the debugging information. For example, in some practical designs, the debugging information may include an error-correcting code (ECC). That is, the reload circuit 311 may perform an ECC algorithm on the data information (for example, including a boot up code) to generate the debugging information. In some other practical designs, the debugging information may include a cyclic redundancy check (CRC) code. That is, the reload circuit 311 may perform a CRC algorithm on the data information (such as a boot up code) to generate the debugging information. In other practical designs, the debugging circuit may perform a checksum algorithm or other debugging algorithms on the boot up code to generate the debugging information. Then, the reload circuit 311 may transmit the boot up code including the data information and the debugging information to all the LTDI circuits S21 to S2*n* (for example, the LTDI circuit 320).

The reload circuit 321 may receive the boot up code from the LTDI circuit 310 (the master IC) via an SPI channel, wherein the boot up code includes the data information and the debugging information corresponding to the data information. The reload circuit 321 may check the correctness of the data information using the debugging information to generate the correctness check result. For example, the reload circuit 321 may check the correctness of the boot up code (data information) using the CRC code (debugging information) to generate the correctness check result.

In step S430, the reload circuit 321 may output the correctness check result to the open-drain circuit 322. In step S440, the open-drain circuit 322 returns the correctness check result to the LTDI circuit 310 (the master IC) via the correctness wire CW. For example, when the correctness check result indicates that the boot up code received by the LTDI circuit 320 is correct, the open-drain circuit 322 is in a high-impedance state (Hi-Z state) for the correctness wire CW. When the correctness check result indicates that the boot up code received by the LTDI circuit 320 is incorrect, the open-drain circuit 322 may pull down (strong pull down) the potential of the correctness wire CW to a low logic level.

Figure 5:
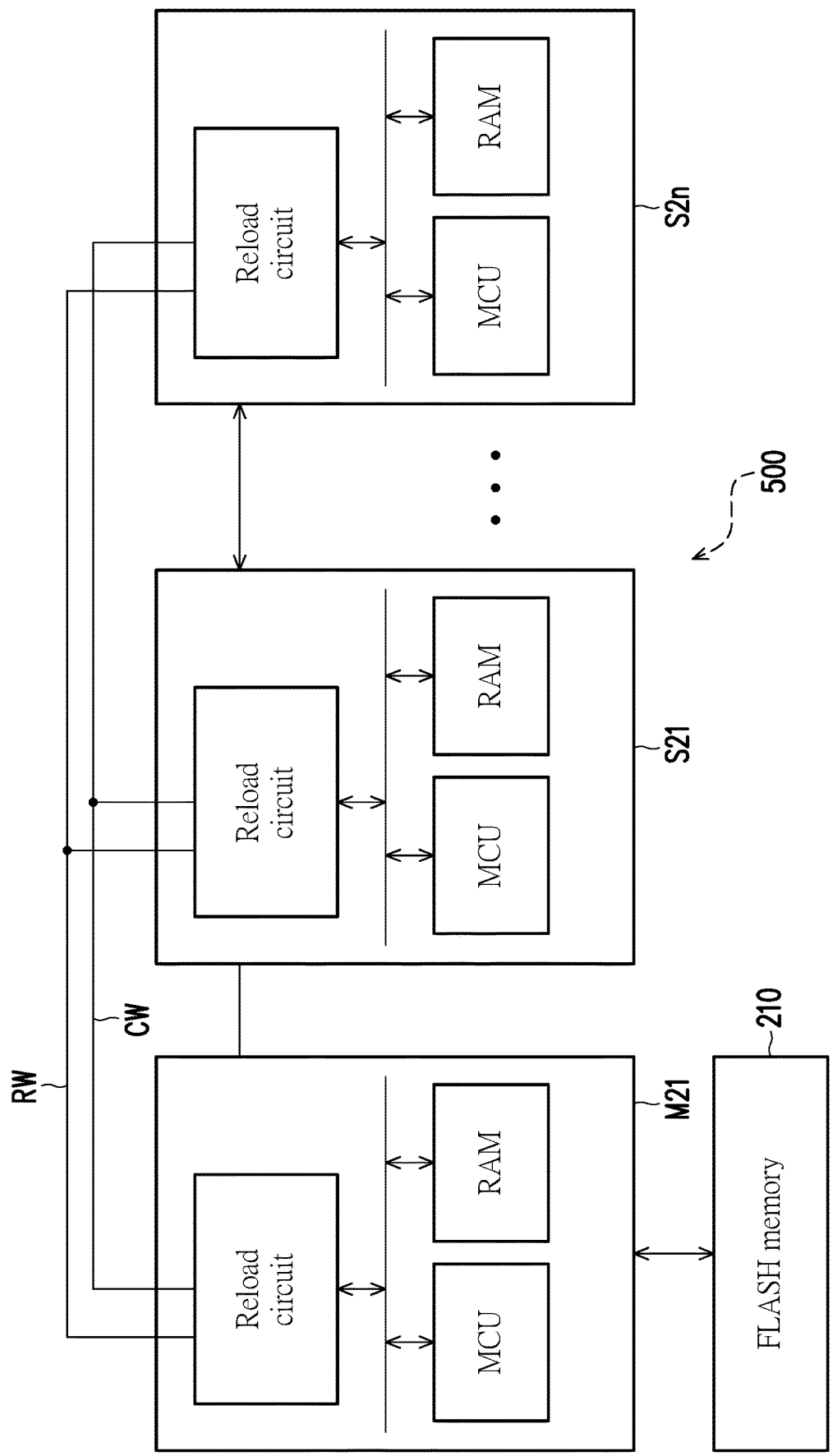
FIG. 5 is a schematic block diagram of a circuit in which slave ICs broadcast a correctness check result and a ready signal to a master IC via different wires shown according to another embodiment of the invention.

FIG. 5 is a schematic block diagram of a circuit in which the LTDI circuits S21 to S2*n* broadcast a correctness check result and a ready signal to the LTDI circuit M21 via different wires shown according to another embodiment of the invention. The FLASH memory 210, the LTDI circuit M21 and the LTDI circuits S21 to S2*n* shown in FIG. 5 can refer to the related description of the FLASH memory 210, the LTDI circuit M21 and the LTDI circuits S21 to S2*n* shown in FIG. 2, and are therefore not repeated herein. The LTDI circuit M21 is not only coupled to the slave integrated circuits S11 to S1*n* via a cascade SPI channel/interface, but in the embodiment shown in FIG. 5, the LTDI circuit M21 may also be coupled to the LTDI circuits S21 to S2*n* via the correctness wire CW and the ready wire RW. The correctness wire CW shown in FIG. 5 is as provided in the related description of FIG. 2 and/or FIG. 3, and is therefore not repeated herein.

For example, any one of the LTDI circuits S21 to S2*n* may receive the boot up code from the LTDI circuit M21 via an SPI channel. Any one of the LTDI circuits S21 to S2*n* may return a ready signal (open-drain signal) indicating "whether the LTDI circuit finished receiving the boot up code" to the LTDI circuit M21 via the ready wire RW. After the boot up code is received, any one of the LTDI circuits S21 to S2*n* may check the correctness of the boot up code from the LTDI circuit M21 to generate a correctness check result. Any one of the LTDI circuits S21 to S2*n* may return the correctness check result (open-drain signal) to the LTDI circuit M21 via the correctness wire CW. Therefore, the LTDI circuit M21 may determine whether all the LTDI circuits S21 to S2*n* received the boot up code according to the potential of the ready wire RW, and determine whether the boot up code received by all the LTDI circuits S21 to S2*n* is correct according to the potential of the correctness wire CW. Compared with the embodiment shown in FIG. 1, in the embodiment shown in FIG. 5, the LTDI circuit M21 does not need to read back all the CRC codes of the LTDI circuits S21 to S2*n*. Accordingly, the LTDI circuit M21 may boot up the plurality of LTDI circuits S21 to S2*n* simply and efficiently.

Figure 6:
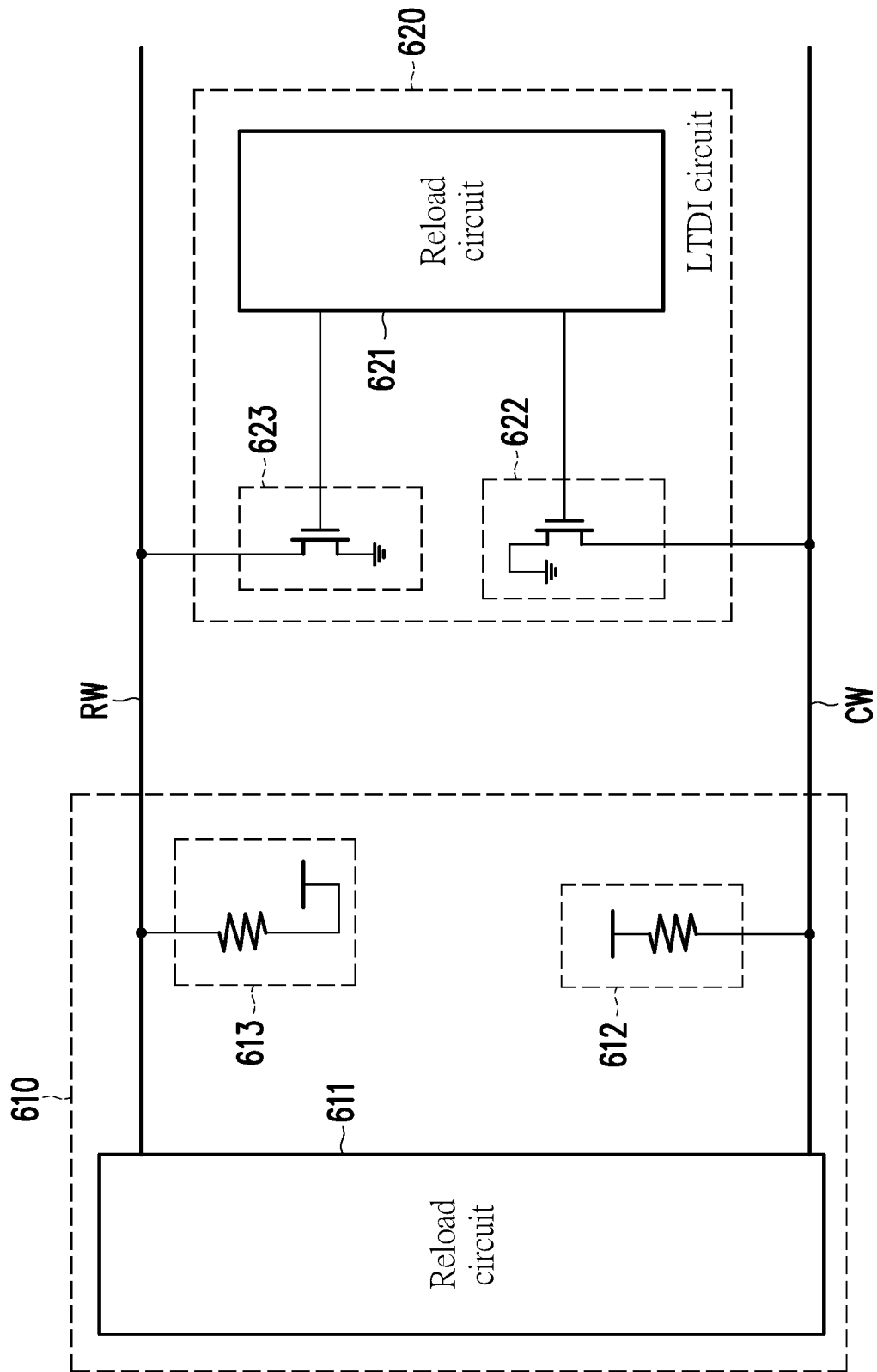
FIG. 6 is a circuit block diagram of an LTDI circuit according to an embodiment of the invention.

FIG. 6 is a circuit block diagram of an LTDI circuit according to an embodiment of the invention. FIG. 6 shows an LTDI circuit 610 and an LTDI circuit 620, wherein the LTDI circuit 610 may be used as the LTDI circuit M21 in the SPI architecture 500 shown in FIG. 5, and the LTDI circuit 620 may be used as one of the LTDI circuits S21 to S2*n* in the SPI architecture 500 shown in FIG. 5. The LTDI circuit 610 includes a reload circuit 611, a pull-up resistor 612, and a pull-up resistor 613. The correctness wire CW shown in FIG. 6 is as provided in the related description of the correctness wire CW shown in FIG. 5, and the ready wire RW shown in FIG. 6 is as provided in the related description of the ready wire RW shown in FIG. 5, and are therefore not repeated herein.

The correctness wire CW is coupled to the first input terminal of the LTDI circuit 610 (the master IC). The potential of the correctness wire CW may be pulled up by the pull-up resistor 612 (weak pull-up). When all the LTDI circuits S21 to S2*n* (such as the LTDI circuit 620) shown in FIG. 5 are all in a high-impedance state for the correctness wire CW, the pull-up resistor 612 of the LTDI circuit 610 (the master IC) may pull up the potential of the correctness wire CW to a high logic level. The reload circuit 611 and the pull-up resistor 612 shown in FIG. 6 are as provided in the related description of the reload circuit 311 and the pull-up resistor 312 shown in FIG. 3, and are therefore not repeated herein. The ready wire RW is coupled to the second input terminal of the LTDI circuit 610 (the master IC). The potential of the ready wire RW may be pulled up by the pull-up resistor 613 (weak pull-up). When all the LTDI circuits S21 to S2*n* (such as the LTDI circuit 620) shown in FIG. 5 are all in a high-impedance state for the ready wire RW, the pull-up resistor 613 of the LTDI circuit 610 (the master IC) may pull up the potential of the ready wire RW to a high logic level.

In the embodiment shown in FIG. 6, the LTDI circuit 620 includes a reload circuit 622, an open-drain circuit 622, and an open-drain circuit 623. The output terminal of the open-drain circuit 622 may be coupled to the correctness wire CW outside the LTDI circuit 620. The reload circuit 621 is coupled to the input terminal of the open-drain circuit 622 and the input terminal of the open-drain circuit 623. The reload circuit 621 and the open-drain circuit 622 shown in FIG. 6 are as provided in the related description of the reload circuit 321 and the open-drain circuit 322 shown in FIG. 3, and are therefore not repeated herein.

In the embodiment shown in FIG. 6, the output terminal of the open-drain circuit 623 is configured to be coupled to the ready wire RW outside the LTDI circuit 620. The ready wire RW is also coupled to the second input terminal of the reload circuit 611 of the master IC. The potential of the ready wire RW is pulled up by the pull-up resistor 613 (weak pull-up). The reload circuit 621 may receive the boot up code from the LTDI circuit 610 (the master IC) via an SPI channel. The reload circuit 621 may return a ready signal indicating "whether the LTDI circuit 620 finished receiving the boot up code" to the LTDI circuit 610 (the master IC) via the open-drain circuit 623 and the ready wire RW. For example, when the ready signal indicates that the LTDI circuit 620 finished receiving the boot up code, the open-drain circuit 623 is in a high-impedance state (Hi-Z state) for the ready wire RW; and when the ready signal indicates that the LTDI circuit 620 is not finished receiving the boot up code, the open-drain circuit 623 may pull down (strong pull down) the potential of the ready wire RW to a low logic level.

Based on the above, the correctness check result and the ready signal of the present embodiment are an open-drain signal. After the LTDI circuit M21 transmits the boot up code to the plurality of LTDI circuits S21 to S2*n* (for example, the LTDI circuit 620), the reload circuit 621 may determine whether the boot up code is received, and then return the ready signal (open-drain signal) to the LTDI circuit M21 (for example, the LTDI circuit 610). For example, when one (or a plurality) of these LTDI circuits S21 to S2*n* is not finished receiving the boot up code, the slave ICs that are not finished receiving the boot up code may pull down the potential of the ready wire RW to a low logic level; and when these LTDI circuits S21 to S2*n* all finished receiving the boot up code, these LTDI circuits S21 to S2*n* are all in a high-impedance state (Hi-Z state) for the ready wire RW, and at this time, the pull-up resistor 613 may pull up the potential of the ready wire RW to a high logic level. Therefore, the LTDI circuit 620 may broadcast the open-drain signal (ready signal) to the LTDI circuit 610 via the ready wire RW. After the LTDI circuit 610 (master IC) transmits the boot up code to these LTDI circuits S21 to S2*n*, the LTDI circuit 610 may determine whether all the LTDI circuits S21 to S2*n* (such as the LTDI circuit 620) finished receiving the boot up code according to the potential of the ready wire RW. Therefore, the LTDI circuit M21 may boot up the plurality of LTDI circuits S21 to S2*n* simply and efficiently.

According to different design requirements, the reload circuit 311, the reload circuit 321, the reload circuit 611, and/or the reload circuit 621 may be implemented by hardware, firmware, software (i.e., program), or a combination of the three. In terms of hardware, the reload circuit 311, the reload circuit 321, the reload circuit 611, and/or the reload circuit 621 may be implemented in a logic circuit on an IC. Related functions of the reload circuit 311, the reload circuit 321, the reload circuit 611, and/or the reload circuit 621 may be implemented as hardware using hardware description languages (for example, Verilog HDL or VHDL) or other suitable programming languages. For example, related functions of the reload circuit 311, the reload circuit 321, the reload circuit 611, and/or the reload circuit 621 may be implemented in one or a plurality of controllers, microcontrollers, microprocessors, application-specific integrated circuits (ASICs), digital signal processors (DSPs), field-programmable gate arrays (FPGAs), and/or various logic blocks, modules, and circuits in other processing units.

In the form of software and/or firmware, the related functions of the reload circuit 311, the reload circuit 321, the reload circuit 611, and/or the reload circuit 621 may be implemented as programming codes. For example, the reload circuit 311, the reload circuit 321, the reload circuit 611, and/or the reload circuit 621 are implemented by using general programming languages (such as C, C++, or assembly language) or other suitable programming languages. The programming codes may be recorded/stored in a "non-transitory computer-readable medium". In some embodiments, the non-transitory computer-readable medium includes, for example, a read-only memory (ROM), a semiconductor memory, a programmable logic circuit, and/or a storage device. The storage device includes a hard-disk drive (HDD), a solid-state drive (SSD), or other storage devices. A central processing unit (CPU), a controller, a microcontroller, or a microprocessor may read and execute the programming codes from the non-transitory computer-readable medium to achieve the related functions of the reload circuit 311, the reload circuit 321, the reload circuit 611, and/or the reload circuit 621.

Although the invention has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. A large touch display integrated (LTDI) circuit, suitable as a slave IC of an SPI architecture, the LTDI circuit comprising:
    a first open-drain circuit having an output terminal configured to be coupled to a correctness wire outside the LTDI circuit, wherein the correctness wire is also coupled to a first input terminal of a master IC of the SPI architecture, and a potential of the correctness wire is pulled up by a first pull-up resistor; and
    a reload circuit coupled to an input terminal of the first open-drain circuit and configured to check a correctness of a boot up code from the master IC to generate a correctness check result, wherein the reload circuit returns the correctness check result to the master IC via the first open-drain circuit and the correctness wire.

2. The LTDI circuit of claim 1, wherein,
    when the correctness check result indicates that the boot up code received by the LTDI circuit is correct, the first open-drain circuit is in a high-impedance state for the correctness wire; and
    when the correctness check result indicates that the boot up code received by the LTDI circuit is incorrect, the first open-drain circuit pulls down the potential of the correctness wire to a low logic level.

3. The LTDI circuit of claim 1, wherein the reload circuit receives the boot up code from the master IC via an SPI channel, the boot up code comprises a data information and a debugging information corresponding to the data information, and the reload circuit checks a correctness of the data information using the debugging information to generate the correctness check result.

4. The LTDI circuit of claim 3, wherein the debugging information comprises a cyclic redundancy check code.

5. The LTDI circuit of claim 1, further comprising:
    a second open-drain circuit having an output terminal configured to be coupled to a ready wire outside the LTDI circuit, wherein the ready wire is also coupled to a second input terminal of the master IC, and a potential of the ready wire is pulled up by a second pull-up resistor,
    wherein the reload circuit receives the boot up code from the master IC via an SPI channel, and the reload circuit returns a ready signal indicating whether the LTDI circuit finished receiving the boot up code to the master IC via the second open-drain circuit and the ready wire.

6. The LTDI circuit of claim 5, wherein, when the ready signal indicates that the LTDI circuit finished receiving the boot up code, the second open-drain circuit is in a high-impedance state for the ready wire; and when the ready signal indicates that the LTDI circuit is not finished receiving the boot up code, the second open-drain circuit pulls down the potential of the ready wire to a low logic level.

7. An operation method of a large touch display integrated (LTDI) circuit, wherein the LTDI circuit is suitable as a slave IC of an SPI architecture, and the operation method comprises:

checking a correctness of a boot up code from a master IC of the SPI architecture by a reload circuit of the LTDI circuit to generate a correctness check result;

outputting the correctness check result to a first open-drain circuit of the LTDI circuit by the reload circuit, wherein an output terminal of the first open-drain circuit is configured to be coupled to a correctness wire outside the LTDI circuit, the correctness wire is also coupled to a first input terminal of the master IC, and a potential of the correctness wire is pulled up by a first pull-up resistor; and returning the correctness check result to the master IC via the correctness wire by the first open-drain circuit.

8. The operation method of claim 7, wherein, when the correctness check result indicates that the boot up code received by the LTDI circuit is correct, the first open-drain circuit is in a high-impedance state for the correctness wire; and when the correctness check result indicates that the boot up code received by the LTDI circuit is incorrect, the first open-drain circuit pulls down the potential of the correctness wire to a low logic level.

9. The operation method of claim 7, further comprising:

receiving the boot up code from the master IC via an SPI channel by the reload circuit, wherein the boot up code comprises a data information and a debugging information corresponding to the data information; and checking a correctness of the data information using the debugging information by the reload circuit to generate the correctness check result.

10. The operation method of claim 9, wherein the debugging information comprises a cyclic redundancy check code.

11. The operation method of claim 7, further comprising:

receiving the boot up code from the master IC via an SPI channel by the reload circuit; and returning a ready signal indicating "whether the LTDI circuit finished receiving the boot up code" to the master IC via a second open-drain circuit of the LTDI circuit and a ready wire outside the LTDI circuit by the reload circuit, wherein an output terminal of the second open-drain circuit is configured to be coupled to the ready wire, the ready wire is also coupled to a second input terminal of the master IC, and a potential of the ready wire is pulled up by a second pull-up resistor.

12. The operation method of claim 11, wherein, when the ready signal indicates that the LTDI circuit finished receiving the boot up code, the second open-drain circuit is in a high-impedance state for the ready wire; and when the ready signal indicates that the LTDI circuit is not finished receiving the boot up code, the second open-drain circuit pulls down the potential of the ready wire to a low logic level.

* * * * *